United States Patent [19]
Haditsch et al.

[11] Patent Number: 5,241,231
[45] Date of Patent: Aug. 31, 1993

[54] ROTOR OF AN ELECTRIC MACHINE HAVING AN EXCITING CURRENT SUPPLY LEAD

[75] Inventors: Werner Haditsch, Nussbaumen; Karl Schöllhorn, Birr, both of Switzerland; Rudolf Paul, Tribuswinkel, Austria

[73] Assignee: Asea Brown Boveri Ltd., Baden, Switzerland

[21] Appl. No.: 931,954

[22] Filed: Aug. 19, 1992

[30] Foreign Application Priority Data

Oct. 1, 1991 [CH] Switzerland .......................... 2903/91

[51] Int. Cl.⁵ ........................................... H02K 11/00
[52] U.S. Cl. ........................................ 310/71; 310/261; 174/176
[58] Field of Search ............... 310/71, 61, 68 R, 261, 310/270; 174/168, 176

[56] References Cited

U.S. PATENT DOCUMENTS

| | | | |
|---|---|---|---|
| 3,457,440 | 7/1969 | Horsley | 310/52 |
| 3,733,502 | 5/1973 | Curtis et al. | 310/61 |
| 4,074,155 | 2/1978 | Haditsch et al. | 310/61 |
| 5,122,696 | 6/1992 | Shih et al. | 310/71 |

FOREIGN PATENT DOCUMENTS

| | | | |
|---|---|---|---|
| 2362886 | 6/1975 | Fed. Rep. of Germany | 310/71 |
| 2618931 | 11/1976 | Fed. Rep. of Germany | 310/71 |
| 2644304 | 9/1990 | France | 310/71 |
| 187785 | 2/1937 | Switzerland | 310/71 |
| 936252 | 6/1982 | U.S.S.R. | 310/71 |
| 190521 | 1/1923 | United Kingdom | 310/71 |
| 775109 | 5/1957 | United Kingdom | 310/71 |

*Primary Examiner*—Steven L. Stephan
*Assistant Examiner*—Matthew Nguyen
*Attorney, Agent, or Firm*—Oblon, Spivak, McClelland, Maier & Neustadt

[57] ABSTRACT

In large electric machines, the electrical connection between the exciter supply lead (7, 8), which extends axially in the center of the rotor, and the exciter winding conductors (4) in the winding overhang (3) of the rotor is highly stressed electrically and mechanically. If use is made of an elastic exciter terminal stud (13) made from steel, and the connecting conductors (17, 18) are supported between the exciter terminal stud (13) and the conductors (4) of the rotor winding overhang on the rotor cap, preferably on its cap plate (6), excessive stresses occur neither on the shaft (2) nor on the connecting conductors (17, 18). It is preferable in this arrangement to make use of a terminal stud (13) that is slotted in the longitudinal direction of the stud and has at least three slots. Such a stud is elastic transversely to its longitudinal direction and can be purposively cooled.

14 Claims, 2 Drawing Sheets

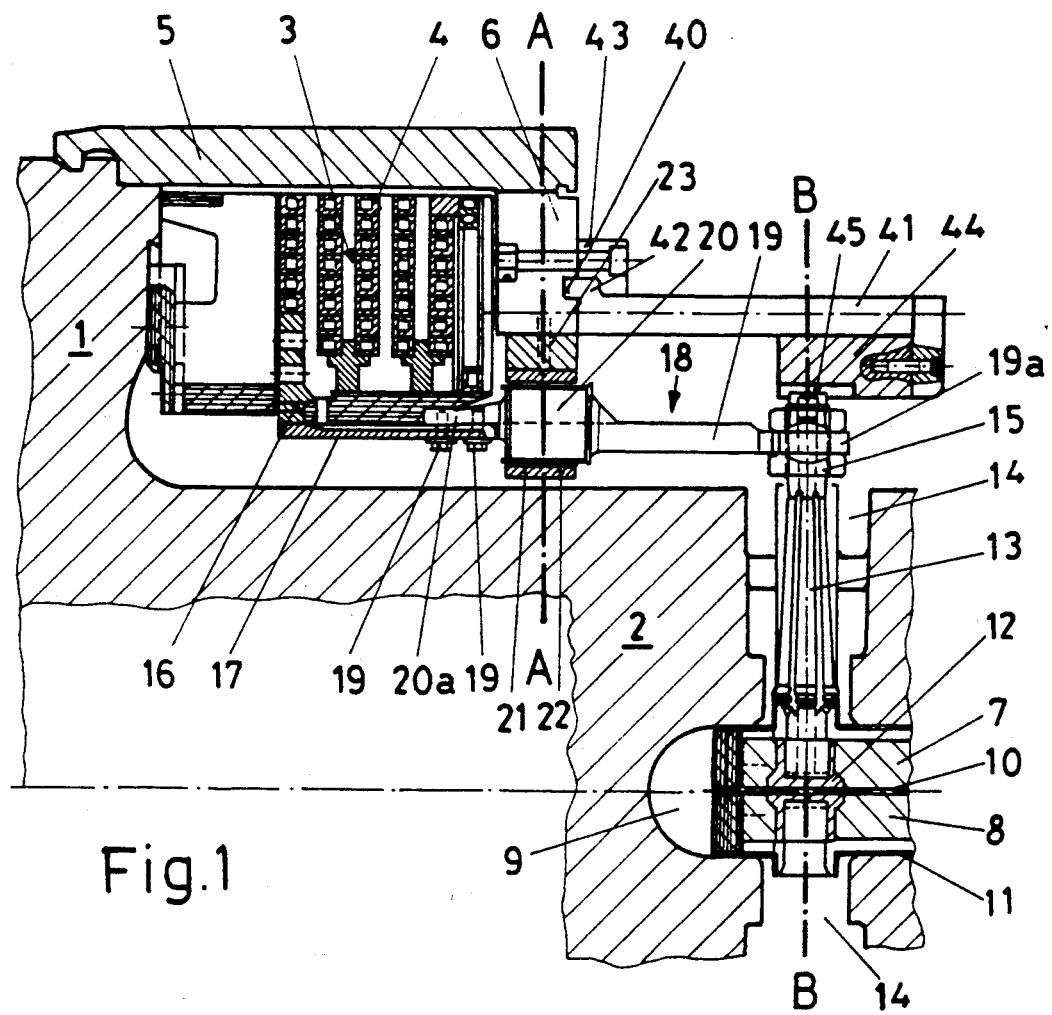
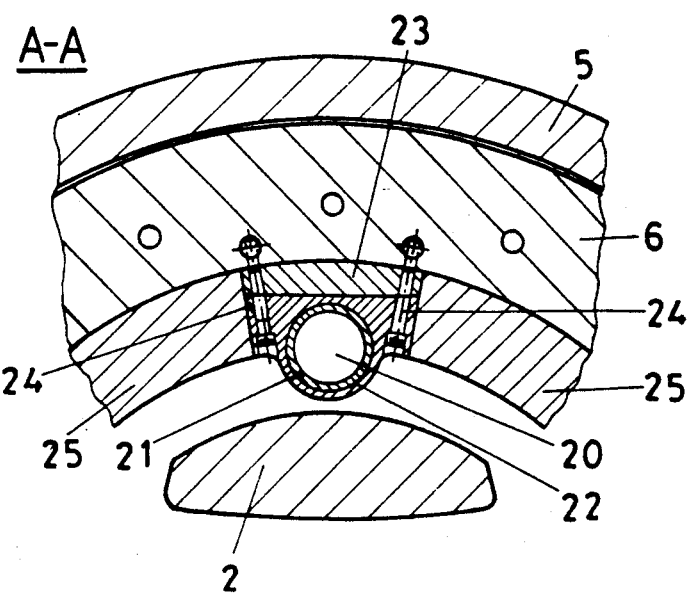

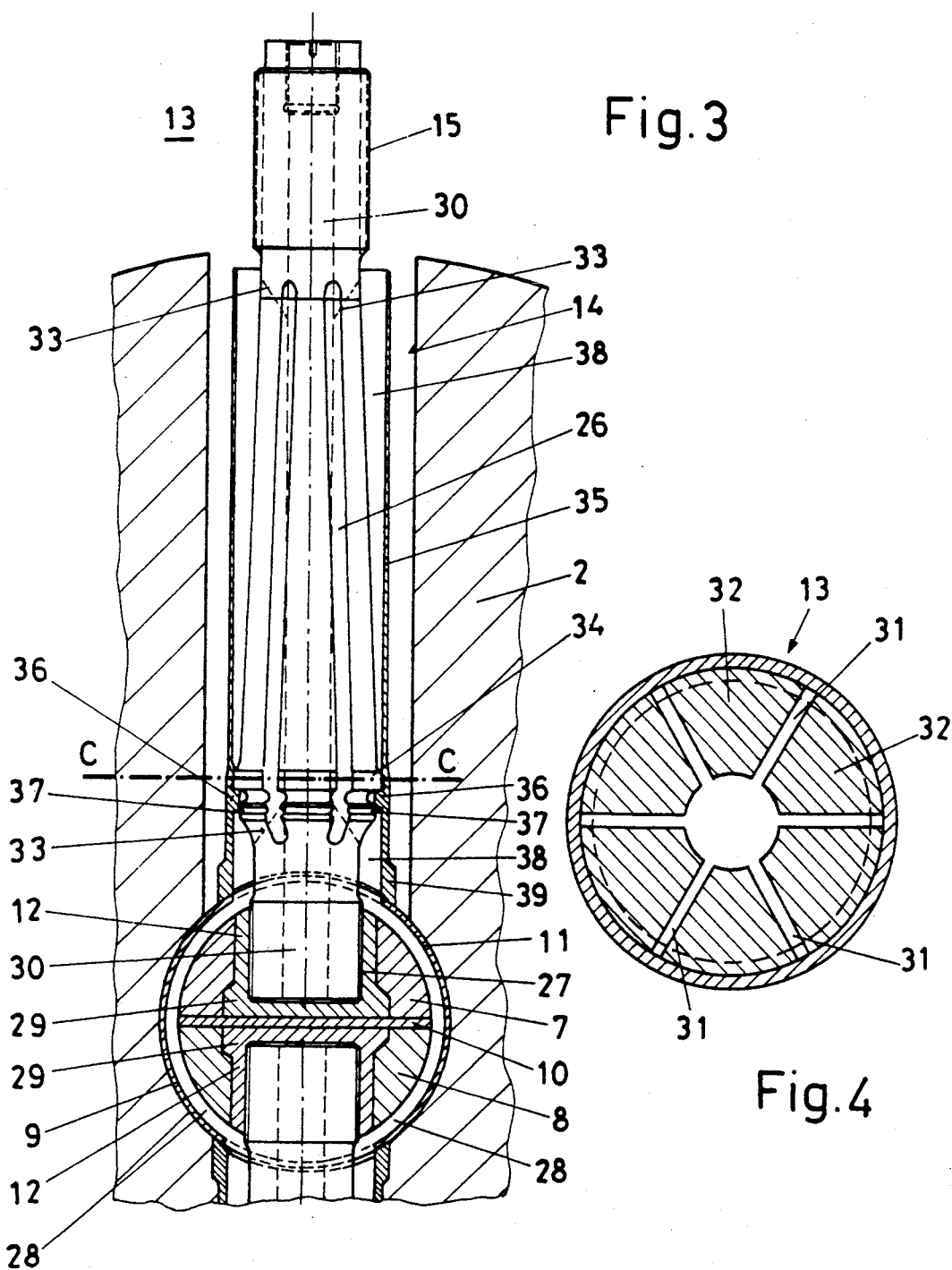

ROTOR OF AN ELECTRIC MACHINE HAVING AN EXCITING CURRENT SUPPLY LEAD

BACKGROUND OF THE INVENTION

1. Field of the Invention

The invention relates to a rotor of an electric machine, in particular a turbo-generator, having an exciting current supply lead for connecting the exciter lead, which extends axially in the center of the rotor, to the exciter winding conductors in the winding overhang of the rotor, which rotor has a rotor cap for supporting the winding overhang of the exciter winding, having an exciter terminal stud made from steel, which is arranged in a radial shaft bore-hole an is connected electrically and mechanically at its inner end to the said exciter lead and is connected electrically and mechanically at its outer end outside the rotor shaft via connecting conductors to the conductors of the rotor winding overhang, and having means for supporting the said connecting conductors.

The invention refers in this connection t the prior art which emerges, for example, from U.S. Pat. 3,733,502.

2. Discussion of Background

In turbo-generators, the guidance of the exciter leads on the rotor to the rotor winding is generally performed in a central shaft bore-hole. The conductors in the shaft bore-hole are mostly solid and insulated all around. Terminal studs are screwed into these solid conductors. A lead is then guided firstly axially from the radially outer end of the studs, and then radially to the exciter winding termination in the rotor winding overhang. In operation this lead is extremely highly stressed as a consequence of the shaft deflection due to the dead weight of the rotor and to unbalance forces.

Thus, in an electric machine according to U.S. Pat. No. 3,733,502 the axial section of this lead is laid in a slot which is sealed by means of slot wedges having a trapezoidal cross section (cf. FIG. 7 there). In order to reduce effects on the radially extending section of the supply leads, the latter extend virtually entirely in the rotor forging.

In German Offenlegungsschrift 2,362,886, the axial conductor sections extend in slots similar to U.S. Pat. No. 3,733,502. There, however, the transition point from the axial to the radial section is formed by separate support elements having rounded edges.

In addition to centrifugal forces, the axially extending lead sections and the associated fixing wedges are also acted upon, in particular, by relative movements between the bolt end and the exciter winding termination in the rotor winding overhang. In the most unfavorable case, it is possible as a result for fatigue cracks which can lead to damage to form in the region of the wedge bearing surfaces in the slots.

It is disadvantageous in all known embodiments that the replacement of the power supply conductors is very expensive.

SUMMARY OF THE INVENTION

Accordingly, it is the object of the invention to construct the exciter power supply lead between the solid conductors in the central shaft bore-hole and the actual winding termination on the rotor winding overhang in such a way that neither the shaft nor the electrical connection is mechanically endangered, and repair is easy to carry out in case of need.

This object is achieved according to the invention when the said connecting conductor is supported on the rotor cap, preferably on its cap plate, in an electrically insulated fashion, and the exciter terminal stud is elastic transverse to the longitudinal direction of the stud.

The shaft deflection produced in operation as a consequence of the dead weight of the rotor and loading due to centrifugal force leads per se to relative movements principally in the longitudinal direction of the machine between the two "fixed points" of screw-in point of the exciter terminal stud into the solid conductors and the rotor winding termination. Due to the support of the contact part on the cap plate, the second-named fixed point is, as it were, displaced to the support point on the cap plate. Due to the flexibility of the exciter terminal stud transverse to its longitudinal direction, it can now follow these relative movements. This leads to a substantial relief of the exciter supply lead.

The connecting conductor between the exciter terminal stud and exciter winding termination in the winding overhang are preferably constructed in two parts and connected to one another detachably. Due to the subdivision, the dismantling and installation of the sole remaining part susceptible to repair, to be precise the stud-side contact part, is possible without great expense—if a defect occurs at all. All that is required is to loosen the screws and the screwed joints at the outer end of the exciter terminal stud, which are all easily accessible.

The slotted stud used in a development of the subject-matter of the invention has the advantage that it is elastic in the longitudinal direction transverse to the longitudinal direction of the stud without appreciable loss of strength. The slotting in the longitudinal direction furthermore enables optimum cooling. The stud according to the invention is also lighter by comparison with known designs, so that there is no need for additional retention by a screwed joint, etc. Cooling of the stud can be further intensified when the stud is provided with a through bore-hole penetrating the entire stud. It is furthermore advantageous to construct the shank conically, the thicker end being at the internal stud end. This reduces the loading due to centrifugal force.

A further intensification of cooling can be achieved when there is pushed over the stud a thin-walled hollow cylinder which is supported by an inwardly projecting projection on a collar on the stud at the level of the transition from the thread to the shank, and cooling gas is purposively led through the space between the stud shank and said cylinder. In conjunction with the slots reaching to below said collar, cooling can be perfected such that the stud withstands all operational stresses from the electrical and mechanical points of view.

Exemplary embodiments of the invention are explained in more detail below together with the advantages achievable thereby with reference to the drawing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a longitudinal section through the end part of the rotor of a turbo-generator;

FIG. 2 shows a section through the cap plate of the rotor in accordance with FIG. 1 along the line AA thereof;

FIG. 3 shows a longitudinal section through the exciter terminal stud of the turbo-generator in accordance with FIG. 1, along the line BB thereof; and FIG. 4 shows a cross section through the exciter terminal stud in accordance with FIG. 3, along the line CC thereof.

DESCRIPTION OF THE PREFERRED EMBODIMENTS

In the longitudinal section through the end part of the rotor of a turbo-generator according to FIG. 1, 1 designates the rotor forging, and 2 the rotor shaft. The rotor winding conductors 4, which are constructed in the case of the example as hollow conductors, are interconnected in the rotor winding overhang 3 in a known way. A rotor cap consisting of a cap ring 5 and cap plate 6 serves to support the rotor winding overhang 3.

The supply of the exciting current to the exciter winding is performed via solid conductors 7, 8 which are provided in a central shaft bore-hole 9 in the rotor shaft 2. The solid conductors 7, 8 are mutually electrically insulated by an insulating layer 10. An insulating tube 11 inserted into the shaft bore-hole 9 serves to insulate the solid conductors 7, 8 with respect to the rotor shaft 2.

At the end on the side of the winding overhang, the two solid conductors 7, 8 are provided with a radial bore-hole into which a threaded insert 12 is introduced in each case. An exciter terminal stud 13 is screwed into this threaded insert 12 in each case. This stud is flexible on all sides transverse to the longitudinal direction of the stud. Its detailed construction will be explained in more detail later with the aid of FIGS. 3 and 4. These studs are located in a radial shaft bore-hole 14 of the rotor shaft 2. The end of the stud projecting from this bore-hole 14 is provided with a thread 15.

The electrical connection between the exciter terminal stud 13 and the rotor winding termination 16 in the rotor winding overhang 3 is performed via a two-part, axially extending connecting conductor. The latter consists on the side of the winding overhang of a lug 17 which is, for example, soldered to the rotor winding termination 16, and on the stud side of a contact part 18 which is screwed at its stud-side end to the terminal stud. According to the invention, this contact part 18 is supported on the cap plate 6 in an electrically insulated and (mechanically) detachable fashion. The lug 17 and contact part 18 are connected to one another detachably, by screws 19 in the case of the example, between the rotor winding termination 16 and support point.

As emerges clearly from FIG. 1 in conjunction with FIG. 2, the contact part 18 is flattened at the stud-side end 19 and provided with an eye 19a. It then merges into a cylindrical part 20 which is equipped at the end with a connecting eye 20a. The cylindrical part 20 is surrounded by an insulating sleeve 21. It is advantageous if this insulating sleeve 21 is secured and protected by a thin shrunk-on steel ring (not drawn in). The cylindrical part 20 is fixed by means of screws 24 to the inner circumference of the cap plate 6 by a retaining bow 22 with interposition of an adapting piece 23. An auxiliary ring 25 serves to produce a uniform annular gap as gas inlet to the rotor winding overhang.

The shaft deflection produced in operation as a consequence of the dead weight of the rotor and loading due to centrifugal force leads per se to relative movements principally in the longitudinal direction of the machine between the two "fixed points" of screw-in point of the exciter terminal stud into the solid conductors 7, 8 and the rotor winding termination 16. Due to the support of the contact part 18 on the cap plate 6, the second-named fixed point is, as it were, displaced to the support point on the cap plate 6. Due to the flexibility of the exciter terminal stud 13 transverse to its longitudinal direction, it can now follow these relative movements. This leads to a substantial relief of the exciter supply lead.

Due to the described subdivision of the connecting conductors between the stud 13 and rotor winding termination 16 (lug 17 and contact part 18), the dismantling and installation of the sole remaining part susceptible to repair, to be precise the stud-side contact part 19, is possible without great expense—if a defect occurs at all. All that is required is to loosen the screws 19 and 24 and the screwed joints at the outer end of the exciter terminal stud, which are all easily accessible.

A preferred embodiment of an exciter terminal stud 13 is represented in FIGS. 3 and 4.

The stud 13 consists of steel and has a conical shank 26 and threads 27, 15 on both ends. At the inner end, the stud 13 is screwed into solid conductors 7, 8, having a semicircular cross section, which extend axially in a central shaft bore-hole 9 of a rotor shaft 2. An insulating layer 10 made from glass fiber reinforced plastic is provided between the two flat sides of the solid conductors 7, 8 for the purpose of mutual insulation. The central shaft bore-hole 9 is lined with an insulating tube 11 which has openings in the region of the studs 13. An annular space 28 through which cooling gas can flow is provided between the insulating tube 11 and the solid conductors 7, 8. Because the solid conductors 7, 8 generally consist of copper or a copper alloy, the stud 13 is screwed into the solid conductors 7, 8 not directly, but with the use of a threaded inset 12 which has a collar 29 on its end facing the flat side of the solid conductors 7, 8.

As can be seen from the stud cross section represented in FIG. 4, the stud shank 26 is provided with a through bore-hole 30 in the longitudinal direction of the stud. In addition, the stud shank 26 is provided in the longitudinal direction of the stud with, in the case of the example, six slots 31 which can be recognized as sectors 32 in FIG. 4. In this connection, a slot is understood to be a material cutout which extends essentially in the longitudinal direction of the stud and in a limiting case extends up to the longitudinal axis of the stud. Said slots 31 reach in the longitudinal direction of the stud up to near the threads 15, 27 and terminate there (dotted lines in 33 in FIG. 3). The radial extent of the slots 31 is to be dimensioned such that the latter intersect the through bore-hole 30. It is also possible to introduce a number of slots 31 other than six, three to be seen as a lower limit, while the upper limit is determined by the remaining residual strength.

A collar 34 is constructed on the stud shank at the transition from the shank 26 to the (internal) thread 27. A thin-walled hollow cylinder 35 is pushed (starting from the internal end) over the stud 13 before the stud 13 is screwed in. The latter has, near its inner end, an annular projection 36 which is inwardly directed and by means of which the hollow cylinder 35 is supported on said collar 34. A safety ring 37 serves to hold the stud 13 and hollow cylinder 36 together. As emerges clearly from FIG. 3, the slots 31 reach to behind the collar 34 before they terminate in the stud section between the collar 34 and the internal thread 27. In this way, the annular space 28 between the solid conductors 7, 8 and the insulating tube 11 is freely connected via the opening in the insulating tube 11 to the annular space 38 between the radially external shank section and the hollow cylinder 35. Cooling gas conveyed by the machine fan can flow, without appreciable impairment, from the annular space 28 in the shaft bore-hole 9 through the slots 31 in the stud shank 26 and, finally, through the annular space 38, before it once again leaves the rotor.

In order that as little cooling gas as possible flows outside the hollow cylinder 35 between the latter and the wall of the radial shaft bore-hole 14, the lower end 39 of the hollow cylinder 39 is thickened and matched to the shape of the insulating tube 11. In addition, the position of the annular projection 36 is dimensioned such that the lower end 39 of the hollow cylinder 35 rests on the insulating tube 11 in the installed state.

In addition to the purposive guidance of cooling gas in and on the stud, the slots 31 have a second essential function: the terminal stud according to the invention is substantially more elastic in the transverse direction without appreciable reduction in the strength of the stud in its longitudinal direction. The result of this is to achieve decoupling between the clamping point of the stud on the solid conductors 7, 8 in the shaft bore-hole 9, on the one hand, and the terminal on the rotor winding overhang 3, which substantially increases the operational reliability of the machine.

Finally, FIG. 1 illustrates a possibility that is easy to realize for the case that the exciter terminal stud or parts thereof or parts of the contact part 19 be spun away under the effect of centrifugal force. Such an event cannot be directly detected in terms of general machine protection, but is expressed (mechanically) in the rise in unbalance.

Provided in the end face of the cap plate 6 is an annular slot 40 in which a cover cylinder 41 made from metal (steel) engages. The cover cylinder 41 is fixed on the outside to the cap plate 6 by a flange 42 and by means of claws 43. The cover cylinder 41 reaches axially beyond the exciter terminal stud 13. A block 44 made from soft metal is fixed at the free end of the cover cylinder 41 to its inside and opposite the exciter terminal stud 13. The distance is dimensioned such that under normal operating conditions a gap 45 of a few millimeters is present between the metal block and the exciter terminal stud 13.

In the event of malfunction, for example breakage of the exciter terminal stud 13, the latter is braked by the metal block 44. Because the metal block 44 together with the cover cylinder 41 and rotor cap are at ground potential, while the exciter terminal stud 13 is at exciter voltage potential, the stand-by ground-fault protection for the generator responds immediately, and leads to immediate deceleration of the machine. In this case, as a consequence of the restriction of the possibility of radial movement of the exciter terminal stud no excessive unbalances occur, either.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A rotor of an electric machine, in particular a turbo-generator, having an exciting current supply lead for connecting an exciter lead, which extends axially in a center of the rotor, to exciter winding conductors in a winding overhand of the rotor, which rotor has a rotor cap for supporting the winding overhang of the exciter winding conductors, having an exciter terminal stud made from steel, which is arranged in a radial shaft bore-hole and is connected at its inner end to the said exciter lead and is connected electrically and mechanically at its outer end outside a rotor shaft via connecting conductors to the exciter winding conductors of the rotor winding overhang, and having means for supporting the said connecting conductors, wherein the said connecting conductors are supported on the rotor cap in an electrically insulated fashion, and the exciter terminal stud is elastic transverse to a longitudinal direction of the stud.

2. The rotor as claimed in claim 1, wherein the connecting conductor is constructed in two parts and comprises a lug on a winding-terminal side, and a contact part on a stud side, the two parts being connected detachably to one another, and a connecting point of the two parts being located between a support point on a rotor cap and a rotor winding termination on the rotor winding overhang.

3. The rotor as claimed in claim 2, wherein the part, facing the exciter terminal stud, of the contact part is flattened and provided at its end with an eye for fixing to the exciter terminal stud, and the other end is constructed cylindrically and has a connecting eye.

4. The rotor as claimed in claim 3, wherein at the cylindrical end the contact part is fixed detachably to the cap plate in an insulated fashion by means of a retaining bow.

5. The rotor as claimed in claim 4, wherein for the purpose of electrically insulating the cylindrical end with respect to the cap plate the former is surrounded by an insulating sleeve.

6. Rotor as claimed in one of claims 1 to 5, wherein a shank of the exciter terminal stud is slotted in the longitudinal direction of the stud, at least three slots being provided which extend radially up top stud axis.

7. Rotor as claimed in claim 6, wherein the stud is provided with a through bore-hole penetrating the entire stud.

8. Rotor as claimed in claim 6, wherein the shank is constructed conically with a thicker end being at an internal stud end.

9. Rotor as claimed in claim 6, wherein there is pushed over the stud a thin-walled hollow cylinder which is supported by an inwardly projecting projection on a collar on the stud at a level of a transition from a thread to the shank.

10. Rotor as claimed in claim 9, wherein the slots in the stud penetrate said collar.

11. Rotor as claimed in one of claims 1 to 5, wherein there is arranged on a rotor cap a cover cylinder which extends axially up to and over the exciter terminal stud, and there is provided at a free end of the cover cylinder a metal block which serves as a constant element and which has a contact surface which is spaced from a radially outer end of the exciter terminal stud by a gap.

12. The rotor of claim 1, wherein said rotor cap includes a cap ring and a cap plate, and wherein said connecting conductors are supported by said cap plate.

13. The rotor of claim 12, further including a cover cylinder connected to said cap plate and extending over said exciter terminal stud.

14. The rotor of claim 1, wherein said connecting conductors extend in a direction transverse to the longitudinal direction of said exciter terminal stud.

* * * * *